United States Patent
Izawa

[11] Patent Number: 5,610,459
[45] Date of Patent: Mar. 11, 1997

[54] PHOTOVOLTAIC DRIVE MOTOR

[75] Inventor: Hirokazu Izawa, Aichi-ken, Japan

[73] Assignee: Kabushiki Kaisha Toshiba, Kawasaki, Japan

[21] Appl. No.: 301,425

[22] Filed: Sep. 9, 1994

[30] Foreign Application Priority Data

Sep. 9, 1993 [JP] Japan ................................ 5-224262

[51] Int. Cl.$^6$ ........................... H02K 11/00; H02K 5/00
[52] U.S. Cl. ..................... 310/68 R; 310/68 D; 310/89
[58] Field of Search ..................... 310/68 R, 89, 310/68 D, 157, 40 MM, 303; 136/291, 293; 60/641.8

[56] References Cited

U.S. PATENT DOCUMENTS

| | | | |
|---|---|---|---|
| 2,919,358 | 12/1959 | Marrison | 310/46 |
| 3,325,930 | 6/1967 | Braeutigam | 40/473 |
| 3,353,191 | 11/1967 | Dahly | 2/171.3 |
| 4,088,115 | 5/1978 | Powell | 126/270 |
| 4,328,417 | 5/1982 | Himes | 250/203.4 |
| 4,333,262 | 6/1982 | Kimura | 446/484 |
| 4,605,813 | 8/1986 | Takeuchi et al. | 136/244 |
| 4,634,343 | 1/1987 | Nakamats | 416/3 |
| 4,751,413 | 6/1988 | Izawa | 310/68 D |
| 5,039,895 | 8/1991 | Meister | 310/68 |
| 5,262,695 | 11/1993 | Kuwano et al. | 310/309 |

FOREIGN PATENT DOCUMENTS

| | | | |
|---|---|---|---|
| 58-50782 | 3/1983 | Japan | 136/291 |
| 61-189781 | 11/1986 | Japan . | |
| 1-39253 | 2/1989 | Japan | 310/40 MM |
| 350988 | 5/1991 | Japan . | |
| 3230743 | 10/1991 | Japan . | |
| 60-154684 | 8/1995 | Japan | 136/291 |

*Primary Examiner*—Steven L. Stephan
*Assistant Examiner*—Jonathan Link
*Attorney, Agent, or Firm*—Cushman Darby & Cushman, IP Group of Pillsbury Madison & Sutro, LLP

[57] ABSTRACT

A photovoltaic drive motor comprises a rotor, a photo shade section and a field magnet means. The rotor includes a printed circuit board, a plurality of electrical conduction arms having a photovoltaic transducer disposed on the printed circuit board with fixed spacing there between, a first short circuit section connected to one end of each of the plurality of electrical conduction arms and a second short circuit section connected to an opposite end of the plurality of electrical conduction arms.

48 Claims, 9 Drawing Sheets

5,610,459

PHOTOVOLTAIC DRIVE MOTOR

BACKGROUND OF THE INVENTION

1. Field of the Invention

This invention relates to a photovoltaic drive motor including a photovoltaic transducer to convert light energy, i.e., electromagnetic radiation, into electrical energy to be used as a rotation motion source for rotating a rotor, the electrical energy being drived from light, including solar radiation.

2. Description of the Prior Art

A conventional photovoltaic drive motor is described hereunder.

A plurality of coils are arranged in a first circle on a surface of a disk-shaped printed circuit board. The printed circuit board is formed as a body of a insulation material. A solar cell, provided as a photovoltaic transducer, is positioned on a second surface of the printed circuit board, opposite the coils. The solar cell is electrically connected to the coils. A rotor of the motor is comprised of the printed circuit board, a shaft which is passes through a center portion of the printed circuit board, the coils and the solar cell.

The rotor is arranged in a motor case with its shaft supported by two shaft bearings. In the motor case, a permanent magnet, serving as a field magnet means, faces the coils from which it is separated by a small gap along the axeal direction of the shaft. A hole is formed in the motor case to expose the solar cell, sun rays irradiating the solar cell directly through the hole.

The solar cell, which is irradiated by the rays of the sun, converts the solar electromagnetic radiation into electrical energy. A photoelectromotive force is generated and supplied as an electric current to the coils. The coils, supplied with the electric current, generate an electromagnetic force from the coil current and interact with a magnetic field of the permanent magnet. As a result, rotor rotation is generated.

In the above-described conventional photovoltaic drive motor, the photovoltaic transducer is used only as an electrical energy supplying source to convert light energy into electrical energy. The coils are an essential portion of the structure. Consequently the structure of the rotor is complicated. Furthermore, both the coils and the photovoltaic transducer are arranged on the printed circuit board, the rotor becomes heavy. As a result, the rotor has a large inertial force, and the responce of the rotor is slow.

SUMMARY OF THE INVENTION

An object of the present invention is to provide a photovoltaic drive motor wherein a photovoltaic transducer is used to perform functions of both an electrical energy supplying source and coils. Another object of the present invention is to provide a photovoltaic drive motor including a rotor having a simple construction, which is small and easy to produce, so that the rotor is lightweight and has small inertial force.

A photovoltaic drive motor of the present invention comprises a rotor including a printed circuit board; a plurality of electrical conduction arms spaced apart on a first surface of the printed circuit board and having first, second ends and each electrical conduction arm comprising at least one photovoltaic cell element; a first short circuit section coupled to the first end of each of the plurality of electrical conduction arms; and a second short circuit section coupled to the second end of each of the plurality of electrical conduction arms; mounting means to rotatably support the rotor, the mounting means including a perform for shading a predetermined part of the first surface of the printed circuit board from light incident on the motor; and field magnet means positioned to a supply magnetic flux to intersect ones of the electrical conduction arms on the predetermined part of the first surface.

Another object of the present invention is to provide a photovoltaic drive motor comprising: a rotor including a printed circuit board formed as a disc having first and second surfaces; a plurality of electrical conduction arms radially oriented and spaced apart on a first surface of the printed circuit board, each electrical conduction arm having first and second ends and each electrical conduction arm comprising at least one photovoltaic cell element; a first short circuit section coupled to the first end of each of the plurality of electrical conduction arms; and a second short circuit section coupled to the second end of each of the plurality of electrical conduction arms; mounting means to rotatably support the rotor, the mounting means including a perform for shading a predetermined part of the first surface of the printed circuit board from light incident on the motor; and field magnet means positioned to a supply magnetic flux to intersect ones of the electrical conduction arms on the predetermined part of the first surface.

Another object of the present invention is to provide a photovoltaic drive motor comprising: a rotor including a printed circuit board formed as a hollow cylinder having inner and outer cylindrical surfaces and opposing ends; a plurality of electrical conduction arms spaced apart on at least one of the inner and outer cylindrical surfaces of the cylinder and extending between the opposing ends of the cylinder, each electrical conduction arm having first and second ends and comprising at least one photovoltaic cell element; a first short circuit section coupled to the first end of each of the plurality of electrical conduction arms; and a second short circuit section coupled to the second end of each of the plurality of electrical conduction arms; mounting means to rotatably support the rotor, the mounting means including a perform for shading a predetermined part of the first surface of the printed circuit board from light incident on the motor; and field magnet means positioned to a supply magnetic flux to intersect ones of the electrical conduction arms on the predetermined part of the first surface.

BRIEF DESCRIPTION OF THE DRAWINGS

An embodiment of the present invention will be described with reference to the accompanying drawings in which.

DETAILED DESCRIPTION OF THE PREFERRED EMBODIMENT

A photovoltaic drive motor constructed in accordance with a first embodiment of the present invention is an axial gap type photovoltaic drive motor. It is described as follows with reference to FIG. 1 through FIG. 7.

Figure 1:
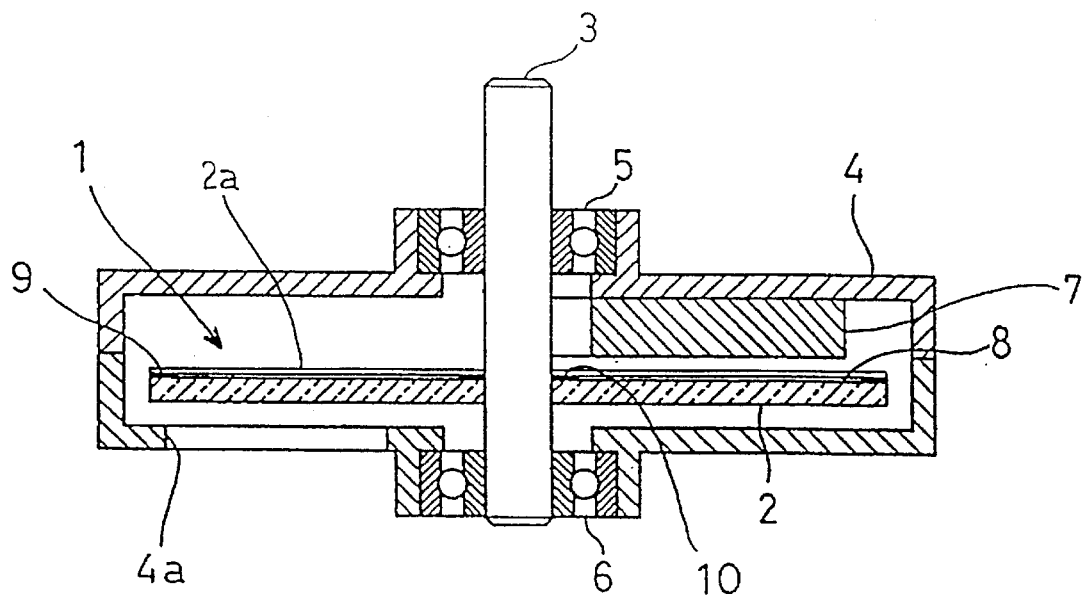
FIG. 1 is a longitudinal sectional view of a photovoltaic drive motor in accordance with a first embodiment of the invention.
Figure 2:
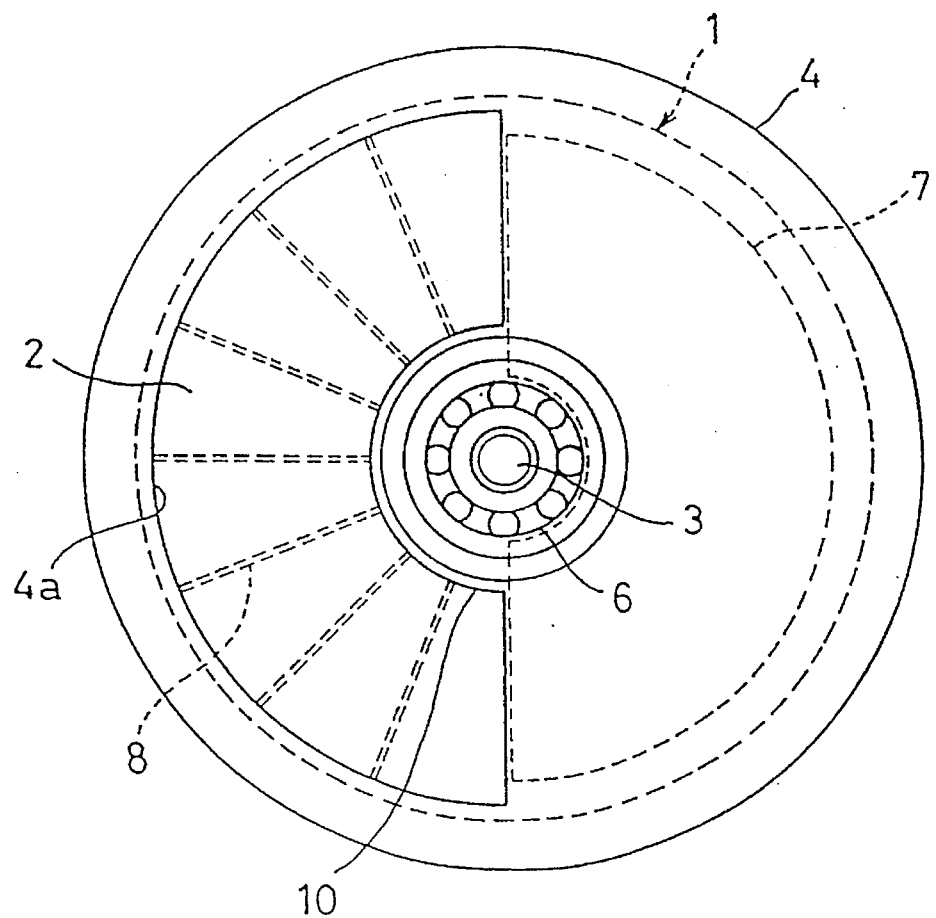
FIG. 2 is a bottom view of the motor in FIG. 1.

FIG. 1 is a longitudinal sectional view of a photovoltaic drive motor, and FIG. 2 is a bottom view of the motor. Referring to FIG. 1 and FIG. 2, a rotor 1 includes a printed circuit board 2 formed as a disc having a substantial plan, and a shaft 3 passing through a center of the printed circuit board 2. The shaft 3 is rotatably supported in a motor case 4, as a flat hollow cylinder, by two bearings 5 and 6. A window section 4a is formed in a bottom wall of the motor case 4, and the window section 4a faces a bottom face of approximately one-half of the printed circuit board 2. Rays of light passing through the window section 4a irradiate several of electrical conduction arms 8 formed on one face of the printed circuit board 2. As a result, the portion of the motor case 4 exclusive of the window section 4a serves as a light shading section means.

Figure 3:
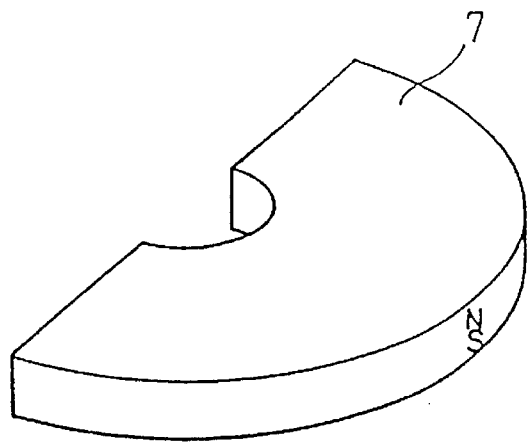
FIG. 3 is a perspective view showing a permanent magnet being attached to the motor in FIG. 1.

A permanent magnet 7, which serves as field magnetic means, is mounted to an upper wall's inner face of the motor case 4, positioned not facing the window section 4a. The permanent magnet 7 faces the printed circuit board 2 with a small gap spaced therefrom. Referring to FIG. 3, an example of the permanent magnet 7 forming a half circle is illustrated. The permanent magnet 7 is magnetized to have perpendicular magnetization. As a result, a magnetic flux of the permanent magnet 7 intersects at substantially a right angle with a rotation plane of the rotor 1.

Figure 4:
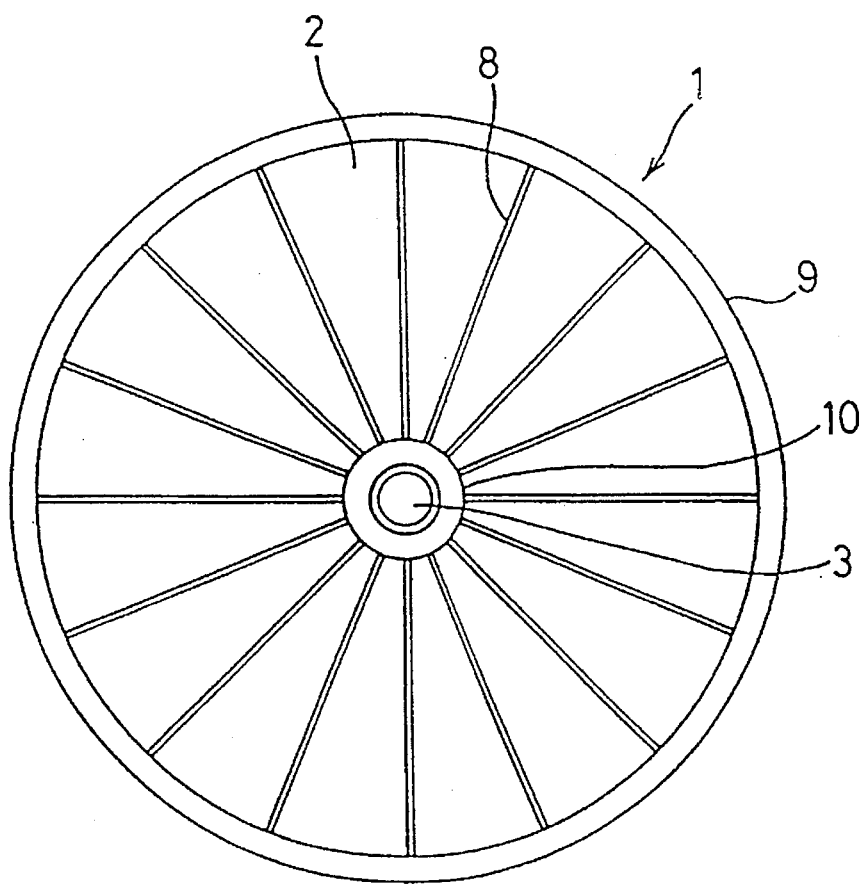
FIG. 4 is a plan view of a rotor of the motor in FIG. 1.
Figure 5:
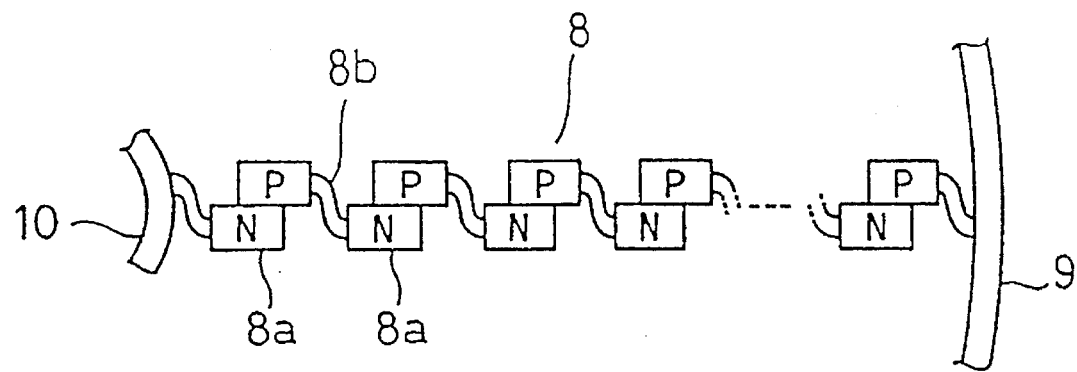
FIG. 5 is a diagramatic enlarged view showing a portion of the rotor of the motor in FIG. 1.

Referring to FIGS. 4 and 5, the printed circuit board 2 can be formed of clear glass and have formed on one face a plurality of amorphous silicon solar battery elements 8a connected in series and configured as the electrical conduction arms 8. Each amorphous silicon solar battery element 8a is a photovoltaic transducer. The electrical conduction arms 8 are positioned on the printed circuit board 2 evenly spaced apart and in a radial direction from the center of the printed circuit board 2. On the one face of the printed circuit board 2, which has plurality of the electrical conduction arms 8, a protective layer made of insulation and transparent material is arranged.

Referring to FIG. 5, the amorphous silicon solar battery elements 8a includes a P-type semiconductor element and an N-type semiconductor element. In this embodiment, the P-type semiconductor element is arranged near a first short-circuit ring 9 positioned at an outer periphery of the printed circuit board 2, and the N-type semiconductor element is arranged near a second short-circuit ring 10 positioned at an inside periphery of the printed circuit board 2. In response to irradiation with light, e.g., rays of the sun, onto the electrical conduction arms 8, each P-type semiconductor element has a higher electric potential and a photoelectromotive force is generated. The respective amorphous silicon solar battery elements 8a are connected in series by the thin filmshaped electrical conduction patterns 8b.

The operation of the above arrangement will be described. Light, e.g., rays of the sun, enter the motor case 4 through the window section 4a. As a result, this light irradeates the electrical conduction arms 8 through the printed circuit board 2 made of the clear glass. The amorphous silicon solar battery elements 8a convert the light, e.g., electromagnetic radiation, into electrical energy and generates photoelectromotive force. In this case, with respect to the electrical conduction arms 8 which are not irradiated by light, e.g., rays of the sun, i.e., those not confronting window section 4a, the first short-circuit ring 9 functions as a diode. Referring to a broken arrow line in FIG. 6 and FIG. 7, an electric current for the photoelectromotive force flows through the following path: the irradiated electrical conduction arms 8—the first short-circuit ring 9—the electrical conduction arms 8 which are not irradeated—the second short-circuit ring 10—the irradiated electrical conduction arms 8.

Figure 6:
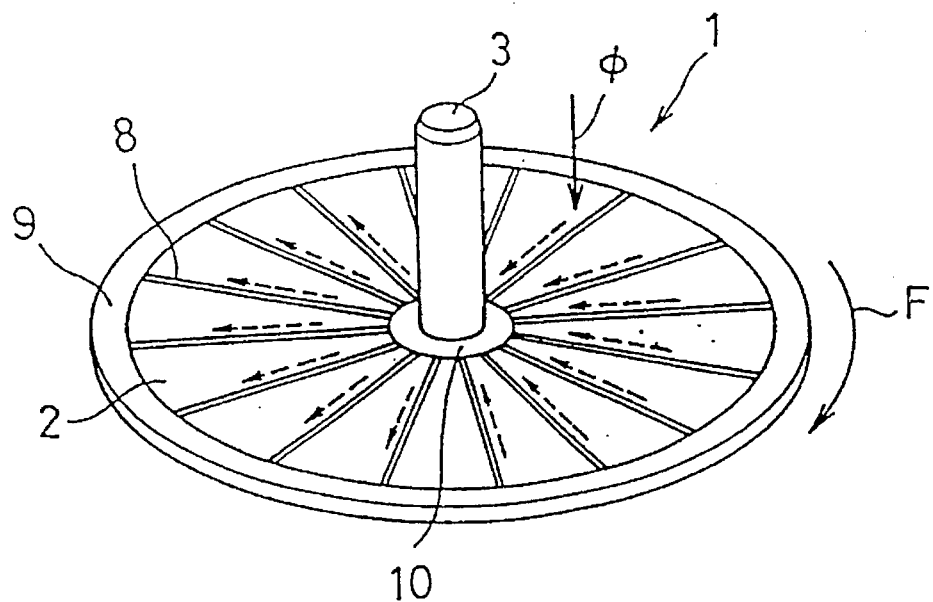
FIG. 6 is a perspective view of the rotor of the motor in FIG. 1.
Figure 7:
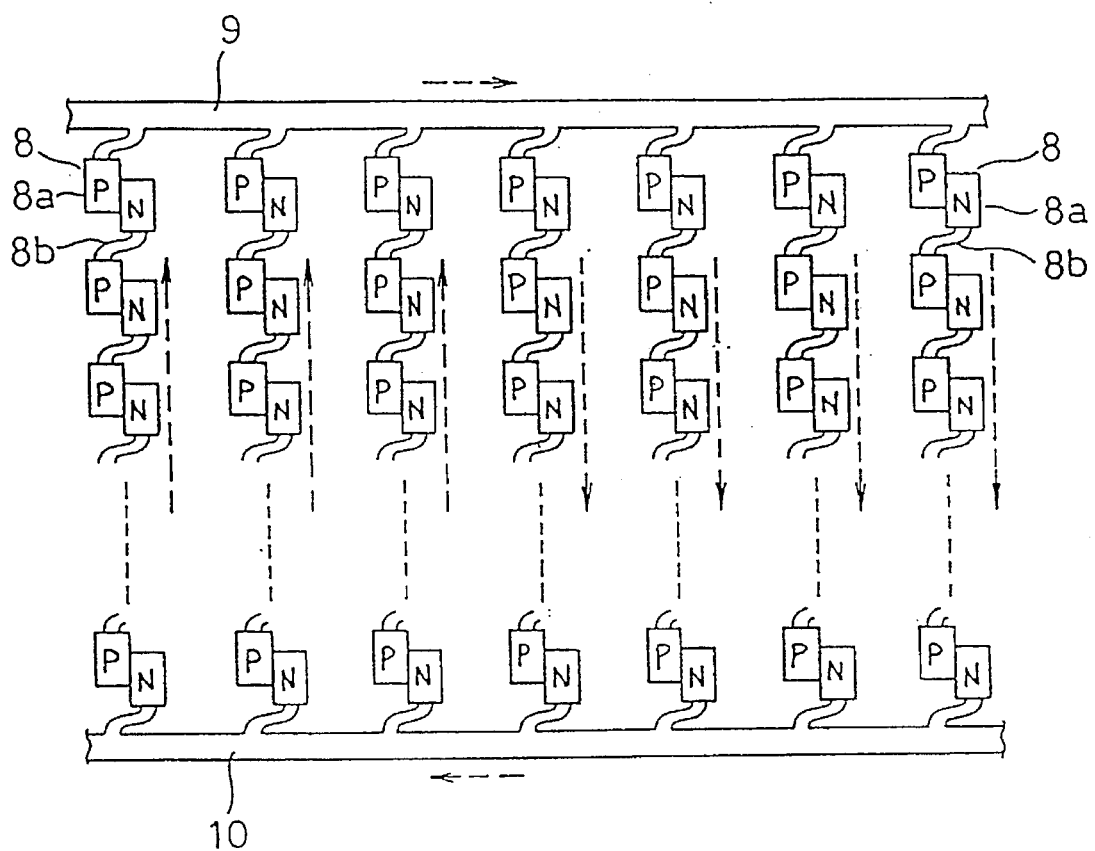
FIG. 7 is a illustrative diagram showing operation of the rotor of the motor in FIG. 1.

Referring to the arrows along the not-irradiated electrical conduction arms 8 of FIG. 6, the magnetic flux from the permanent magnet 7 intersects the electrical conduction arms 8 at right angles so that an electromagnetic force is exerted on each electrical conduction arm 8 in the direction of the arrow F. As a result, the rotor 1 rotates in the direction of the arrow F. With the rotor 1 rotating, successive electrical conduction arms 8 move into and out of the area of window section 4a so that irradiated electrical conduction arms 8 are continuously changing place and the rotating torque is generated for the rotor 1 continuously. Therefore, the rotor 1 rotates continuously when electromagnetic radiation, e.g., rays of the sun, enter the motor case 4 through the window section 4a.

In accordance with the above-described embodiment, each electrical conduction arm 8, which comprises the plurality of amorphous silicon solar battery elements 8a connected in series, serves the function of the electric energy supplying source and the coil function. It is therefore not necessary to arrange the coils independently. The structure of the rotor 1 is therefore simplified, the weight is light and the inertial force of the rotor 1 is small.

Each electrical conduction arm 8 comprises the plurality of amorphous silicon solar battery elements 8a, so a high electric current flows in the each electrical conduction arm 8, with the result that the rotating torque of the rotor 1 is significant. Also, by using the permanent magnet 7 as the field magnet supplying source, an electric energy supplying source is not necessary for generating the magnetic field.

In accordance with the above-described embodiment, the permanent magnet 7, which serves as field magnetic means, is installed inside the motor case 4 so that the magnetic flux from the permanent magnet 7 intersects at right angles with the electrical conduction arms 8. However, it is also possible to mount the permanent magnet 7 outside of the motor case 4. In accordance with variations of the above-described embodiment, it is possible to locate the permanent magnet 7 to confront the window section 4a, or to locate a pair of permanent magnets of respectively opposite polarities to confront and not confront the window section 4a, respectively.

Figure 8:
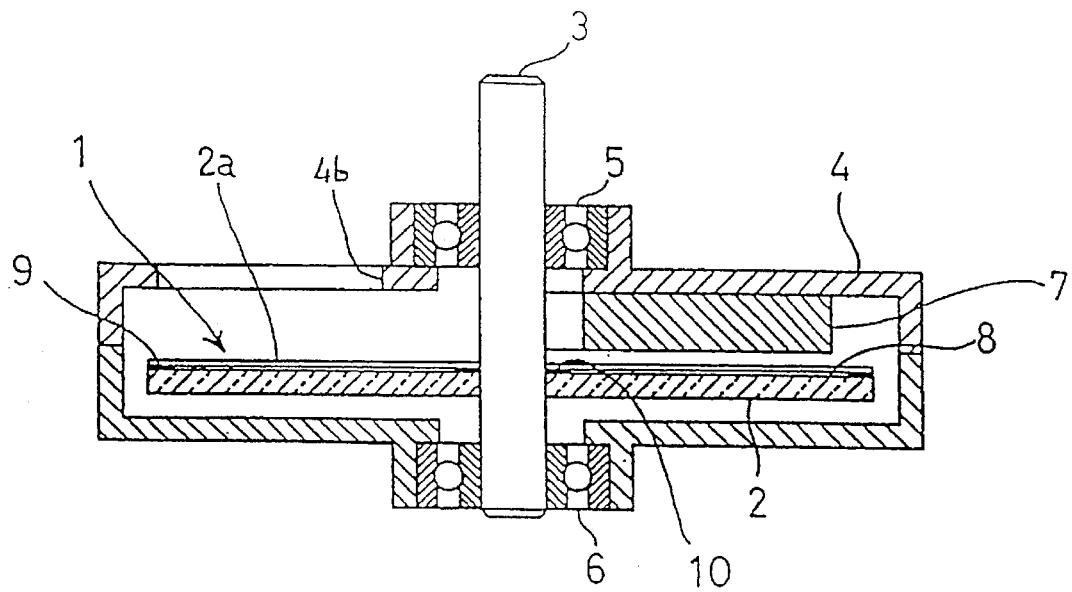
FIG. 8 is a longitudinal sectional view of a photovoltaic drive motor in accordance with another embodiment of the first embodiment.
Figure 9:
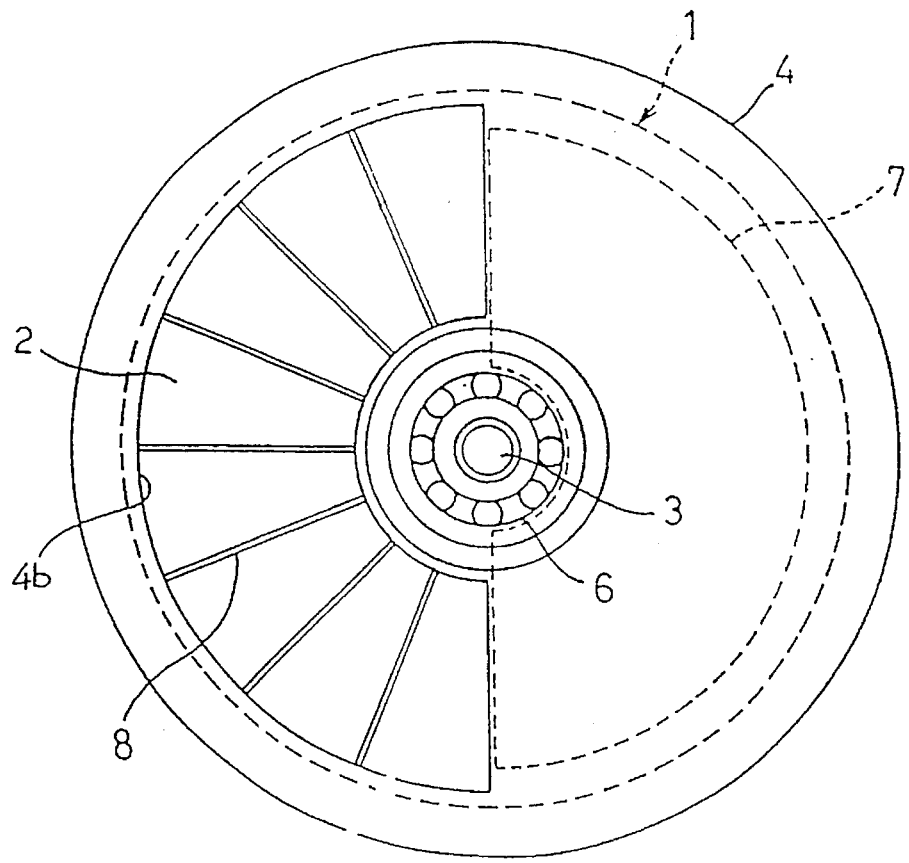
FIG. 9 is a bottom view of the motor in FIG. 8.

In accordance with the above-described embodiment the printed circuit board 2 is formed of clear glass. However, it is possible to provide the printed circuit board 2 formed of opaque glass or another insulating material and, referring to FIG. 8 and FIG. 9, arrange the electrical conduction arms 8 on the surface thereof facing the window section 4b.

In accordance with the above-described embodiment, while a high photoelectromotive force is generated for the first short-circuit ring 9, it is possible that the high photoelectromotive force to be generated for the second short-circuit ring 10 so that the rotor 1 rotates in the reverse direction.

Figure 10:
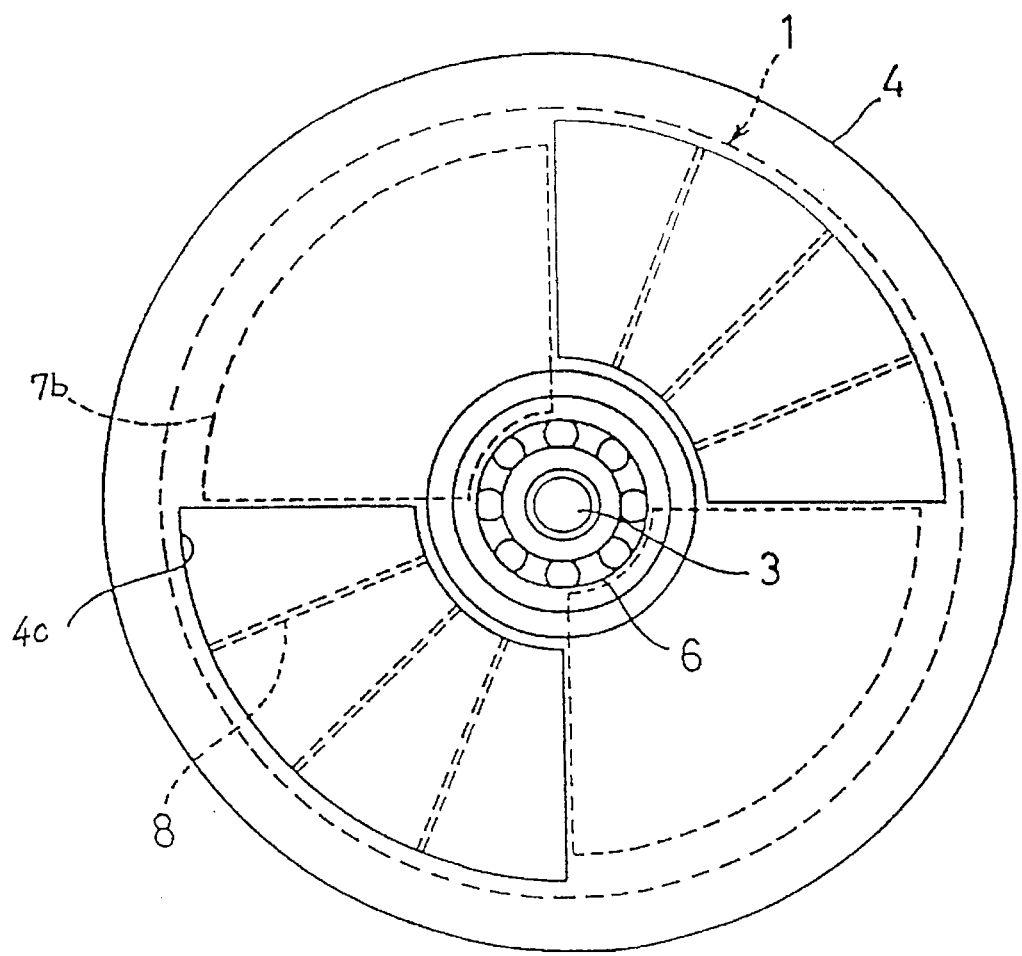
FIG. 10 is a bottom view of a photovoltaic drive motor in accordance with another embodiment of the first embodiment.

In the first embodiment the motor case 4 has one window section 4a. However the invention can be also practiced effectively using a motor case 4 with two or more window sections 4c (FIG. 10).

Figure 11:
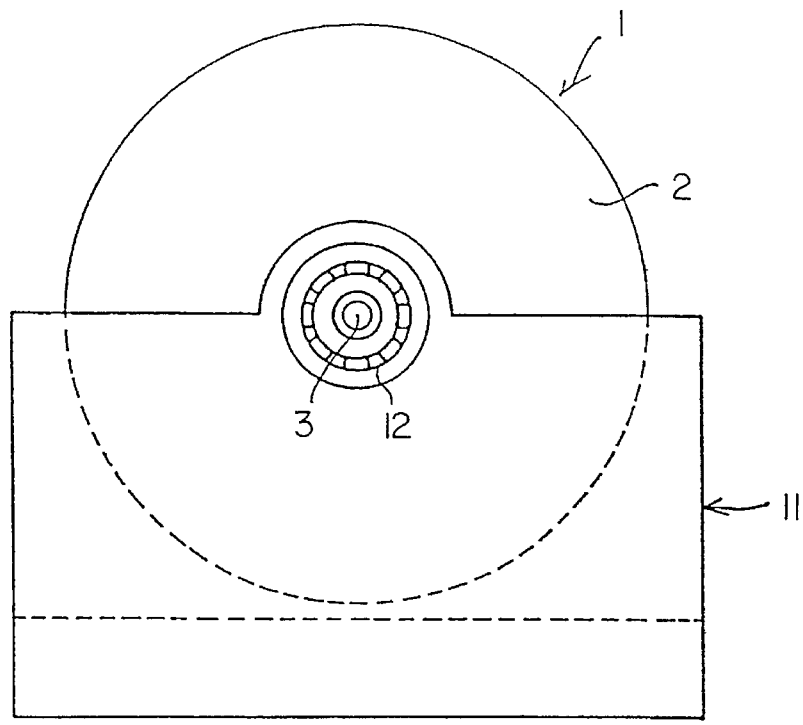
FIG. 11 is a front view of a photovoltaic drive motor in accordance with a second embodiment of the invention.
Figure 12:
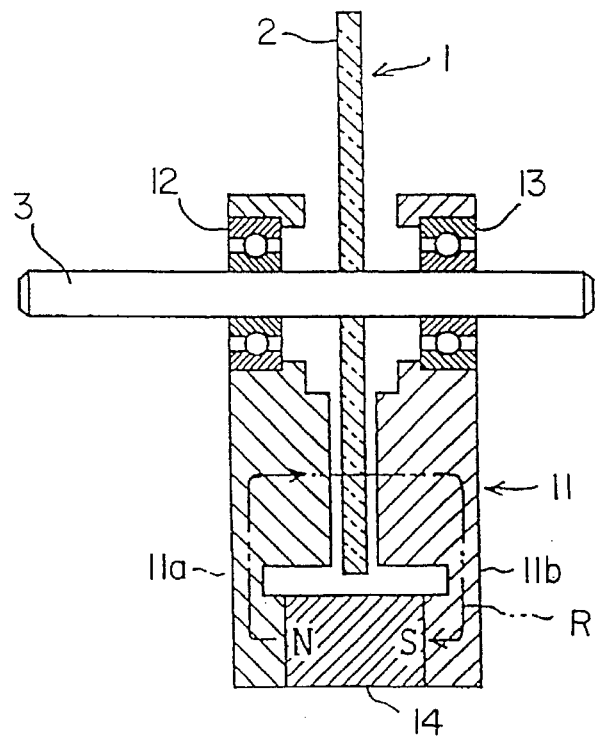
FIG. 12 is a longitudinal sectional view of the motor in FIG. 11.

The second embodiment of the present invention is described hereunder with reference to FIG. 11 and FIG. 12.

The rotor 1 has the same construction as described above with respect to FIG. 1 through FIG. 7. The rotor 1 is supported by two bearings 12 and 13 in a motor case 11, such that approximately one-half of the rotor 1 is exposed outside of the motor case 11. The motor case 11 functions as a photo shade section means for shading the electrical conduction arms 8 on the portion of rotor 1 within the motor case 11 from light, e.g., rays of the sun.

The motor case 11 includes a pair of side cases 11a and 11b, which are made of magnetic materials and arranged with a gap between them for mounting of the rotor 1. A permanent magnet 14, serving as field magnet means, is positioned in the gap and in contact with the pair of side cases 11a and 11b. The permanent magnet 14 is positioned to generate the flux lines of its magnetization in parallel with the axial direction of the rotor 1. The dotted arrow R in FIG. 12 designates a magnetic circuit formed in the motor case 11. As a result, a magnetic flux of the permanent magnet 14 intersects at right angles with a rotating plane of the rotor 1.

Consequently, the rotor 1 is caused to rotate with a portion of the electrical conduction arms 8 being exposed to irradiation by light, e.g., rays of the sun from one side or both sides, in the same manner as described in the first embodiment.

A third embodiment of the present invention is directed to a radial gap type motor. The third embodiment is described with reference to FIG. 13 through FIG. 15.

Figure 13:
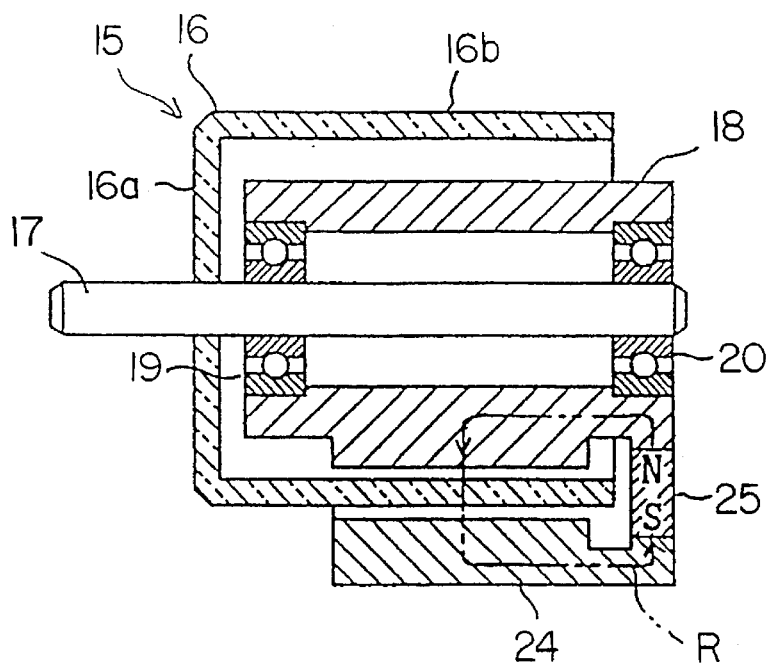
FIG. 13 is a side sectional view of a photovoltaic drive motor in accordance with a third embodiment of the invention.
Figure 14:
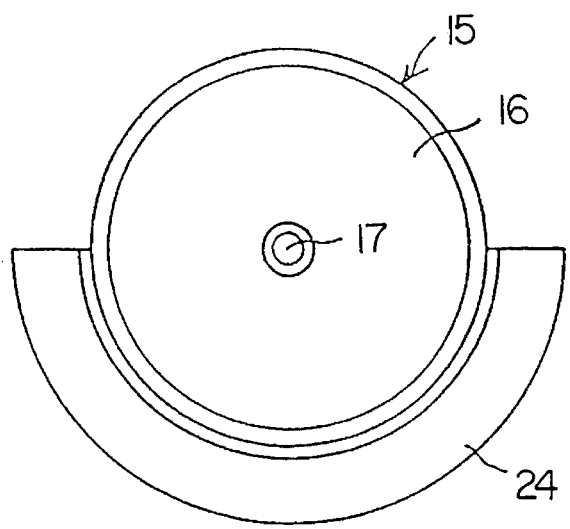
FIG. 14 is a plan view of the motor in FIG. 13.
Figure 15:
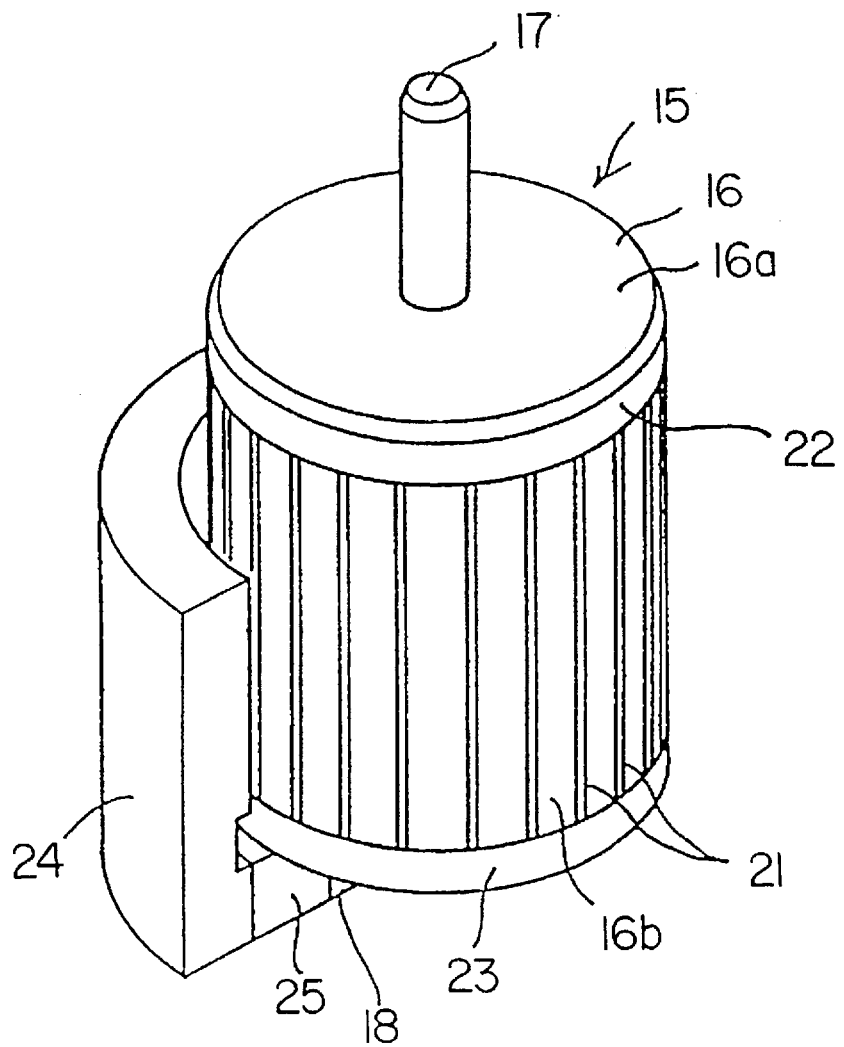
FIG. 15 is a perspective view of the motor in FIG. 13.

Referring to FIG. 13 through FIG. 15, a rotor 15 having a cup-shaped form includes a printed circuit board 16 formed of a hollow cylinder having a bottom section 16a and a shaft 17 that passes through a center of the bottom section 16a. The shaft 17 is supported in the yoke 18 by two bearings 19 and 20. The shaft 17 is made of the magnetic material formed in a cylindrical shape.

Referring to FIG. 15, the outside cylinder section 16b of the cylinder 16 includes a plurality of electrical conduction arms 21, disposed substantially parallel to each other and to an axis of rotation of rotor 15. The first short-circuit ring 22 is connected to the ends of the electrical conduction arms 21 in one side, and a second short-circuit ring 23 is connected to the other ends of the electrical conduction arms 21 in the other side. On the outside cylinder section 16b, a protective layer made of the insulating and transparent material is arranged.

The support yoke 24 which is made of magnetic material serves as a photo shade section, and is formed a half to have a circular arc. A gap is provided between the support yoke 24 and the yoke 18 in which the cylinder section 16b can rotate freely. The support yoke 24 and the yoke 18 are connected. Incident light on the motor, e.g., rays of the sun, irradiates the portion of electrical conduction arms 21 not disposed between the yoke 18 and the support yoke 24.

A permanent magnet 25, which serves as field magnet means, is disposed as a joint section interposed between the yoke 18 and the support yoke 24. The permanent magnet 25 is magnetized in the radial direction of the rotor 15. Referring to the dotted arrow R in FIG. 13, a magnetic circuit is formed in the yoke 18 and the support yoke 24. Consequently, a magnetic flux of the permanent magnet 25 intersects at right angles the cylinder section 16b of the rotor 15.

As a result, a portion of the electrical conduction arms 21 are irradiated by incident light, the rays of the sun, an electric current for a photoelectromotive force of irradiated electrical conduction arms 21 flow through the following path: the irradiated electrical conduction arms 21—the first short-circuit ring 22—the electrical conduction arms 21 which are not irradiated—the second-short-circuit ring 23 the irradiated electrical conduction arms 21. As a result, the rotor 15 rotates due to an electromagnetic force which is generated by the electric current and the magnetic flux of the permanent magnet 25.

In accordance with the above-described embodiments, which utilize amorphous silicon photovoltaic elements, it is also possible to construct such elements utilizing polycrystalline photovoltaic elements or other types of elements.

While the above-mentioned embodiments have shading portions for shading approximately one-half of the rotors. The present invention is not so limited, the present invention can be also practiced effectively using a shading portion which shades more than one-half or less than one-half of the rotor.

What is claimed is:

1. A photovoltaic drive motor comprising:
   (a) a rotor including:
      a printed circuit board;
      a plurality of electrical conduction arms spaced apart on a first surface of the printed circuit board, each conduction arm having first and second ends and each electrical conduction arm comprising at least one photovoltaic cell element;
      a first short circuit section coupled to the first end of each of the plurality of electrical conduction arms; and
      a second short circuit section coupled to the second end of each of the plurality of electrical conduction arms;
   (b) mounting means rotatably supporting the rotor and shading a predetermined portion of the first surface of the printed circuit board from light incident on the motor; and
   (c) field magnet means positioned opposing the predetermined portion of the printed circuit board to generate magnetic flux in response to an electromotive force in the electrical conduction arms located on the predetermined portion of the printed circuit board, the electromotive force being generated by the photovoltaic cell elements in the electrical conduction arms located on an illuminated portion of the printed circuit board.

2. The photovoltaic drive motor according to claim 1, wherein the mounting means comprises a motor case.

3. The photovoltaic drive motor according to claim 1, wherein the field magnet means includes a magnet mounted on the motor case.

4. The photovoltaic drive motor according to claim 1, wherein each of the electrical conduction arms comprises a plurality of photovoltaic cell elements coupled in series.

5,610,459

5. The photovoltaic drive motor according to claim 1, wherein the shading portion shades approximately one-half of the plurality of electrical conduction arms.

6. The photovoltaic drive motor according to claim 1, wherein the field magnet means is a permanent magnet.

7. The photovoltaic drive motor according to claim 1, wherein the electrical conduction arms are uniformly spaced apart.

8. The photovoltaic drive motor according to claim 1, wherein the material of printed circuit board is glass.

9. The photovoltaic drive motor according to claim 1, further comprising a protective layer arranged on the first surface of the printed circuit board which has the plurality of the electrical conduction arms.

10. A photovoltaic drive motor comprising:

(a) a rotor including:
   a printed circuit board shaped as a disc having first and the second surfaces;
   a plurality of electrical conduction arms radially oriented and spaced apart on the first surface of the printed circuit board, each electrical conduction arm having first and second ends and each electrical conduction arm comprising at least one photovoltaic cell element;
   a first short circuit section coupled to the first end of each of the plurality of electrical conduction arms; and
   a second short circuit section coupled to the second end of each of the plurality of electrical conduction arms;

(b) mounting means rotatably supporting the rotor and shading a predetermined portion of the first surface of the printed circuit board from light incident on the motor; and (c) field magnet means positioned opposing the predetermined portion of the printed circuit board to generate magnetic flux in response to an electromotive force in the electrical conduction arms located on the predetermined portion of the printed circuit board, the electromotive force being generated by the photovoltaic cell elements in the electrical conduction arms located on an illuminated portion of the printed circuit board.

11. The photovoltaic drive motor according to claim 10, wherein the mounting means comprises a motor case.

12. The photovoltaic drive motor according to claim 11, wherein the motor case has at least one window.

13. The photovoltaic drive motor according to claim 12, wherein the light enters through the window of the motor case.

14. The photovoltaic drive motor according to claim 11, wherein a portion of the disc extends from the motor case to receive the incident light.

15. The photovoltaic drive motor according to claim 10, wherein the field magnet means includes a magnet mounted to the motor case.

16. The photovoltaic drive motor according to claim 15, wherein the magnet faces a first surface of the disc.

17. The photovoltaic drive motor according to claim 15, wherein a magnetic circuit of the magnet includes the motor case.

18. The photovoltaic drive motor according to claim 10, wherein each of the electrical conduction arms comprises a plurality of photovoltaic cell elements coupled in series.

19. The photovoltaic drive motor according to claim 10, wherein the shading portion shades approximately one-half of the plurality of electrical conduction arms.

20. The photovoltaic drive motor according to claim 10, wherein the field magnet means is a permanent magnet.

21. The photovoltaic drive motor according to claim 10, wherein the electrical conduction arms are uniformly spaced apart.

22. The photovoltaic drive motor according to claim 10, wherein the printed circuit board is made of glass, the light passes through said glass to reach the electrical conduction arms.

23. The photovoltaic drive motor according to claim 12, wherein the printed circuit board is made of fiber board, the window is on the same side as the magnet means.

24. The photovoltaic drive motor according to claim 10, further comprising a protective layer arranged on the first surface of the printed circuit board which has a plurality of the electrical conduction arms.

25. A photovoltaic drive motor comprising:

(a) a rotor including:
   a printed circuit board shaped as a hollow cylinder having inner and outer cylindrical surfaces and first and second opposing ends;
   a plurality of electrical conduction arms spaced apart on at least one of the inner and outer cylindrical surfaces of the cylindrical printed circuit board and extending between the opposing ends of the cylindrical printed circuit board, each electrical conduction arm comprising at least one photovoltaic cell element;
   a first short circuit section coupled to the first end of each of the plurality of electrical conduction arms; and
   a second short circuit section coupled to the second end of each of the plurality of electrical conduction arms;

(b) mounting means rotatably supporting the rotor and shading a predetermined portion of the first surface of the printed circuit board from light incident on the motor; and (c) field magnet means positioned opposing the predetermined portion of the printed circuit board to generate magnet flux in response to an electromotive force in the electrical conduction arms located on the predetermined portion of the printed circuit board, the electromotive force being generated by the photovoltaic cell elements in the electrical conduction arms located on an illuminated portion of the printed circuit board.

26. The photovoltaic drive motor according to claim 25, wherein the mounting means comprises a motor case.

27. The photovoltaic drive motor according to claim 26, wherein the motor case comprises at least one window.

28. The photovoltaic drive motor according to claim 27, wherein the light enters through the window of the motor case.

29. The photovoltaic drive motor according to claim 26, wherein a portion of the hollow cylinder extends from the motor case to receive incident light.

30. The photovoltaic drive motor according to claim 25, wherein the field magnet means includes a magnet mounted to the motor case.

31. The photovoltaic drive motor according to claim 30, wherein the magnet faces one cylindrical surface of the hollow cylinder.

32. The photovoltaic drive motor according to claim 30, wherein a magnetic circuit of the magnet includes the motor case.

33. The photovoltaic drive motor according to claim 25, wherein each of the electrical conduction arms comprises a plurality of photovoltaic cell elements coupled in series.

34. The photovoltaic drive motor according to claim 25, wherein the shading portion shades approximately one-half of the plurality of electrical conduction arms.

35. The photovoltaic drive motor according to claim 25, wherein the field magnet means is a permanent magnet.

36. The photovoltaic drive motor according to claim 25, wherein the electrical conduction arms are uniformly spaced apart.

37. The photovoltaic drive motor according to claim 25, wherein the printed circuit board is made of fiber board, the electrical conduction arms on outer cylindrical surface.

38. The photovoltaic drive motor according to claim 25, wherein the printed circuit board is made of glass.

39. The photovoltaic drive motor according to claim 38, wherein the electrical conduction arms on inside of the hollow cylinder, the light passes through the glass to reach the electrical conduction arms.

40. The photovoltaic drive motor according to claim 38, wherein the electrical conduction arms are formed on both inner and outer cylindrical surfaces.

41. The photovoltaic drive motor according to claim 25, wherein the electrical conduction arms are axially oriented.

42. The photovoltaic drive motor according to claim 25, wherein the printed circuit board is cup-shaped.

43. The photovoltaic drive motor according to claim 25, further comprising a protective layer arranged on at least one of the inner and outer cylindrical surface of the printed circuit board, having the plurality of the electrical conduction arms.

44. A photovoltaic drive motor comprising:
a rotor including:
a printed circuit board;
a plurality of electrical conduction arms spaced apart on a first surface of the printed circuit board, each conduction arm having first and second ends and each conduction arm comprising at least one photovoltaic cell element; and
a first short circuit section coupled to the first end of each of the plurality of electrical conduction arms; and
a second short circuit section coupled to the second end of each of the plurality of electrical conduction arms;
means for shading a portion of the printed circuit board from light incident on the motor; and
field magnet means opposing the shaded portion of the printed circuit board, current being generated by the photovoltaic cells based on light incident upon the electrical conduction arms located on an illuminated portion of the printed circuit board, an electromagnetic force being generated by passing the current through the electrical conduction arms located on the shaded portion of the printed circuit board.

45. A photovoltaic drive motor comprising:
(a) a rotor including:
a printed circuit board;
a plurality of electrical conduction arms spaced apart on a first surface of the printed circuit board, each conduction arm having first and second ends and each electrical conduction arm comprising at least one photovoltaic cell element;
a first short circuit section coupled to the first end of each of the plurality of electrical conduction arms; and
a second short circuit section coupled to the second end of each of the plurality of electrical conduction arms;
(b) a mounting unit rotatably supporting the rotor and shading a predetermined portion of the first surface of the printed circuit board from light incident on the motor; and (c) a field magnet positioned opposing the predetermined portion of the printed circuit board to generate magnetic flux in response to electromotive force in the electrical conduction arms located on the predetermined portion of the printed circuit board, the electromotive force being generated by the photovoltaic cell elements in the electrical conduction arms located on an illuminated portion of the printed circuit board.

46. A photovoltaic drive motor comprising:
(a) a rotor including:
a printed circuit board shaped as a disc having first and the second surfaces;
a plurality of electrical conduction arms radially oriented and spaced apart on the first surface of the printed circuit board, each electrical conduction arm having first and second ends and each electrical conduction arm comprising at least one photovoltaic cell element;
a first short circuit section coupled to the first end of each of the plurality of electrical conduction arms; and
a second short circuit section coupled to the second end of each of the plurality of electrical conduction arms;
(b) a mounting unit rotatably supporting the rotor and shading a predetermined portion of the first surface of the printed circuit board from light incident on the motor; and
(c) a field magnet positioned opposing the predetermined portion of the printed circuit board to generate magnetic flux in response to electromotive force in the electrical conduction arms located on the predetermined portion of the printed circuit board, the electromotive force being generated by the photovoltaic cell elements in the electrical conduction arms located on an illuminated portion of the printed circuit board.

47. A photovoltaic drive motor comprising:
(a) a rotor including:
a printed circuit board shaped as a hollow cylinder having inner and outer cylindrical surfaces and first and second opposing ends;
a plurality of electrical conduction arms spaced apart on at least one of the inner and outer cylindrical surfaces of the cylindrical printed circuit board and extending between the opposing ends of the cylindrical printed circuit board, each electrical conduction arm comprising at least one photovoltaic cell element;
a first short circuit section coupled to the first end of each of the plurality of electrical conduction arms; and
a second short circuit section coupled to the second end of each of the plurality of electrical conduction arms;
(b) a mounting unit rotatably supporting the rotor and shading a predetermined portion of the first surface of the printed circuit board from light incident on the motor; and
(c) a field magnet positioned opposing the predetermined portion of the printed circuit board to generate magnet flux in response to electromotive force in the electrical conduction arms located on the predetermined portion of the printed circuit board, the electromotive force being generated by the photovoltaic cell elements in the electrical conduction arms located on an illuminated portion of the printed circuit board.

48. A photovoltaic drive motor comprising:
a rotor including:

a printed circuit board;

a plurality of electrical conduction arms spaced apart on a first surface of the printed circuit board, each conduction arm having first and second ends and each conduction arm comprising at least one photovoltaic cell element; and a first short circuit section coupled to the first end of each of the plurality of electrical conduction arms; and a second short circuit section coupled to the second end of each of the plurality of electrical conduction arms;

a unit for shading a portion of the printed circuit board from light incident on the motor; and a field magnet opposing the shaded portion of the printed circuit board, current being generated by the photovoltaic cells based on light incident upon the electrical conduction arms located on an illuminated portion of the printed circuit board, an electromagnetic force being generated by passing the current through the electrical conduction arms located on the shaded portion of the printed circuit board.

* * * * *